(12) United States Patent
Sole et al.

(10) Patent No.: US 10,708,590 B2
(45) Date of Patent: **\*Jul. 7, 2020**

(54) METHODS AND APPARATUS FOR COLLABORATIVE PARTITION CODING FOR REGION BASED FILTERS

(71) Applicant: INTERDIGITAL VC HOLDINGS, INC., Wilmington, DE (US)

(72) Inventors: Joel Sole, San Diego, CA (US); Yunfei Zheng, San Jose, CA (US); Qian Xu, Folsom, CA (US); Peng Yin, Ithaca, NY (US); Xiaoan Lu, Yardley, PA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,598

(22) Filed: Jul. 18, 2017

(65) Prior Publication Data

US 2017/0318290 A1  Nov. 2, 2017

Related U.S. Application Data

(63) Continuation of application No. 13/382,800, filed as application No. PCT/US2010/001917 on Jul. 7, 2010, now Pat. No. 9,743,081.

(Continued)

(51) Int. Cl.
*H04N 19/00* (2014.01)
*H04N 19/117* (2014.01)
(Continued)

(52) U.S. Cl.
CPC ......... *H04N 19/117* (2014.11); *H04N 19/147* (2014.11); *H04N 19/174* (2014.11);
(Continued)

(58) Field of Classification Search
CPC ........ H04N 7/26; H04N 19/147; H04N 19/46; H04N 19/196; H04N 19/86; H04N 19/174; H04N 19/82; H04N 19/117
See application file for complete search history.

(56) References Cited

U.S. PATENT DOCUMENTS

| 5,412,431 A | 5/1995 | Vogel |
| 9,743,081 B2 | 8/2017 | Sole et al. |

(Continued)

FOREIGN PATENT DOCUMENTS

| CN | 1514649 | 7/2004 |
| CN | 1849791 | 10/2006 |

(Continued)

OTHER PUBLICATIONS

Chien et al., "Adaptive Filter Based on Combination of Sum-Modified Laplacian Filter Indexing and Quadtree Partitioning", VCEG Meeting, Document VCEG-AL27, 38th Meeting: London, UK / Geneva, CH, Jul. 1-8, 2009, two pages.

(Continued)

*Primary Examiner* — Frank F Huang
(74) *Attorney, Agent, or Firm* — Ronald Kolczynski

(57) ABSTRACT

Methods and apparatus are provided for collaborative partition coding for region based filters. An apparatus includes a video encoder (100) for encoding image data for a plurality of regions in a picture. The video encoder (100) includes multiple filters for filtering the image data based on region partition information for the plurality of regions. The region partition information for the plurality of regions is shared between the multiple filters.

19 Claims, 8 Drawing Sheets

Related U.S. Application Data

(60) Provisional application No. 61/223,523, filed on Jul. 7, 2009.

(51) Int. Cl.
*H04N 19/147* (2014.01)
*H04N 19/46* (2014.01)
*H04N 19/196* (2014.01)
*H04N 19/174* (2014.01)
*H04N 19/82* (2014.01)
*H04N 19/86* (2014.01)

(52) U.S. Cl.
CPC ........... *H04N 19/196* (2014.11); *H04N 19/46* (2014.11); *H04N 19/82* (2014.11); *H04N 19/86* (2014.11)

(56) References Cited

U.S. PATENT DOCUMENTS

| | | | |
|---|---|---|---|
| 2002/0118748 A1 | 8/2002 | Inomata et al. | |
| 2010/0074330 A1* | 3/2010 | Fu ..................... | H04N 19/147 375/240.12 |
| 2012/0114048 A1 | 5/2012 | Sole et al. | |
| 2012/0213276 A1 | 8/2012 | Hagai et al. | |

FOREIGN PATENT DOCUMENTS

| | | |
|---|---|---|
| EP | 1677545 | 7/2006 |
| JP | 4035596 | 2/1992 |
| JP | 5176310 | 7/1993 |
| JP | 200614301 | 1/2006 |
| JP | 2008104228 | 5/2008 |
| WO | WO2008033595 | 3/2008 |
| WO | WO2008057308 | 5/2008 |

OTHER PUBLICATIONS

Huang et al., "Adaptive Quadtree-Based Multi-Reference Loop Filter", VCEG Meeting, Document: VCEG-AK24, 37th Meeting: Yokohama, Japan, Apr. 15-18, 2009, two pages.

Huang et al., "Improved Quadtree-Based Adaptive Loop Filter", VCEG Meetin, Document: VCEG-AL24, 38th Meeting: London, UK / Geneva, CH, Jul. 1-8, 2009, one page.

Leduc et al., "Adaptive Motion-Compensated Wavelet Filtering for Image Sequence Coding", IEEE Transactions on Image Processing, vol. 6, No. 6, Jun. 1997, pp. 865-867.

Lee et al., "Loop-Filteing and Post-Filtering for Low Bit-Rates Moving Picturer Coding", Image Processing, 1999, ICIP 99, vol. 1, Kobe, Japan, Oct. 24-28, 1999, pp. 94-98.

Guleryuz, "A Nonlinear Loop Filter for Quantization Noise Removal in Hybrid Video Compression", DoCoMo USA Laboratories, Inc., San Jose, CA, four pages.

ITU-T H-264 Standard, "Advanced Video Coding for Generic Audiovisual Services", International Telecommunication Union, Mar. 2005, 343 pages.

Chujoh et al., "Block-Based Adaptive Loop Filter", VCEG Meeting, Document: VCEG-AI18, 35th Meeting: Berlin, Germany, Jul. 16-18, 2008, six pages.

Karczewicz et al., "Post-Filter SEI Message Extensions", VCEG Meeting, Document: VCEG-A134, 35th Meeting: Berlin, Germany, Jul. 16-18, 2008, three pages.

Chujoh et al., "Specification and Experimental Results of Quadtree-Based Adaptive Loop Filter", VCEG Meeting, Document: VCEG-AK22 (r1), 37th Meeting: Yokohama, Japan, Apr. 15-18, 2009, eleven pages.

PCT International Search Report dated Feb. 2, 2011.

* cited by examiner

METHODS AND APPARATUS FOR COLLABORATIVE PARTITION CODING FOR REGION BASED FILTERS

CROSS-REFERENCE TO RELATED APPLICATIONS

This application claims the benefit of U.S. Provisional Application Ser. No. 61/223,523, filed Jul. 7, 2009, which is incorporated by reference herein in its entirety.

TECHNICAL FIELD

The present principles relate generally to video encoding and decoding and, more particularly, to methods and apparatus for collaborative partition coding for region based filters.

BACKGROUND

In recent years, region based in-loop and out-loop filters, such as interpolation filters, de-blocking/de-artifacting filters, pre/post processing filters, loop filters, and so forth, are emerging in video coding to improve coding efficiency and perceptual quality. Such filters usually partition a video frame into multiple regions based on content or rate-distortion (RD) cost. Then the filter structure and/or parameters can adapt to the local content characteristics of each region. This approach works well for non-stationary video signals. However, the region based filter usually has to spend overhead bits to code the partitions/segmentations, which would degrade the overall performance brought by the adaptation. This is especially true when multiple region based filters exist at the same time in an encoder/decoder, and the segmentation is independently done for each filter. The bits paid for coding the segmentations of all filters would be demanding and can take away the gain obtained from these filters.

Block Adaptive Loop Filter (BALF)

In a first prior art approach, a block based adaptive loop filter is proposed, wherein a reconstructed frame is restored towards the original frame by a Wiener filter. The coefficients of the Wiener filter are estimated at the encoder and sent to the decoder as side information. Although a Wiener filter can restore the reconstructed frame to the original frame globally, there are degraded pixels locally. Since the degraded areas reduce the predictive efficiency for future coding frames, not filtering these areas will improve the coding performance. In BALF, the frame is partitioned into equal-size blocks, and a switch flag is used for each block to control whether or not the block is filtered. In a second prior art approach, a quad-tree scheme is introduced to indicate whether or not a variable-size block of a frame is filtered. When using the variable-size block scheme, the overhead for coding the sizes and locations of blocks is demanding although the filter performance is better than the equal-size block scheme.

Spatio-Temporal Adaptive Loop Filter (STALF)

Inspired by sparsity-based de-noising techniques, a non-linear in-loop filter has been proposed in a third prior art approach. The nonlinear in-loop filter averages multiple de-noised estimates which are obtained by thresholding the coefficients in an over-complete transform domain. For de-artifacting work, the choice of filtering parameters such as, for example, threshold, is important. The applied threshold plays a crucial part in controlling the de-noising capacity of the filter as well as in computing the averaging weights used in emphasizing the better de-noising estimates. In the third prior art approach, thresholds that are selected per pixel class based on quantization parameter (QP) and coding mode information are encoded and transmitted as side information to the decoder. The threshold does not adapt based on the video content.

A block based filter parameter adaptation scheme has also been proposed for use in improving the performance of the above sparsity based de-artifacting filter in video compression. More specifically, the adaptation of the filter parameters is based, not only on the quantization parameter and coding information, but also on the regions of the video sequences, which achieves the spatio-temporal adaptation. In each region, the filter parameters (e.g., threshold) are selected based on a rate-distortion cost, since the region information and the parameters need to be signaled.

Multiple Region Based Filters

When there is more than one region based filter existing in an encoder/decoder, the partition or segmentation of a frame is performed independently for each filter. The partition information also needs to be sent to the decoder for each filter, which is redundant because the segmentation usually has a strong correlation to the video content.

SUMMARY

These and other drawbacks and disadvantages of the prior art are addressed by the present principles, which are directed to methods and apparatus for collaborative partition coding for region based filters.

According to an aspect of the present principles, there is provided an apparatus. The apparatus includes a video encoder for encoding image data for a plurality of regions in a picture. The video encoder includes multiple filters for filtering the image data based on region partition information for the plurality of regions. The region partition information for the plurality of regions is shared between the multiple filters.

According to another aspect of the present principles, there is provided a method in a video encoder. The method includes encoding image data for a plurality of regions in a picture. The image data is filtered by multiple filters based on region partition information for the plurality of regions. The region partition information for the plurality of regions is shared between the multiple filters.

According to yet another aspect of the present principles, there is provided an apparatus. The apparatus includes a video decoder for decoding image data for a plurality of regions in a picture. The video decoder includes multiple filters for filtering the image data based on region partition information for the plurality of regions. The region partition information for the plurality of regions is shared between the multiple filters.

According to a further aspect of the present principles, there is provided a method in a video decoder. The method includes decoding image data for a plurality of regions in a picture. The image data is filtered by multiple filters based on region partition information for the plurality of regions. The region partition information for the plurality of regions is shared between the multiple filters.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
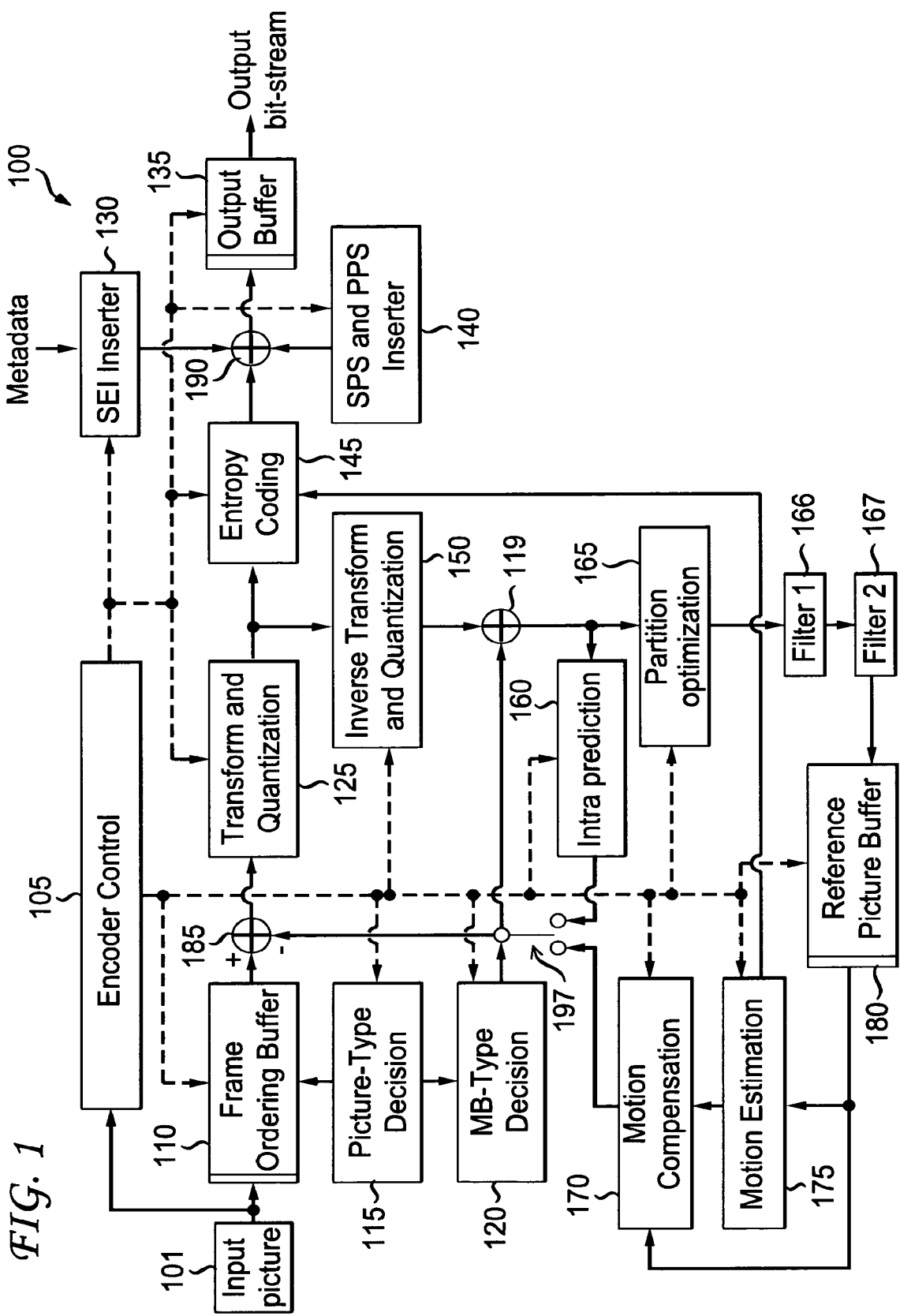
FIG. 1 is a block diagram for an exemplary video encoder to which the present principles may be applied in accordance with an embodiment of the present principles.

The present principles are directed to methods and apparatus for collaborative partition coding for region based filters.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, as used herein, the words "picture" and "image" are used interchangeably and refer to a still image or a picture from a video sequence. As is known, a picture may be a frame or a field.

Further, as used herein, the phrase "picture region" (or simply "region" for short) refers to a portion of a picture encompassing and/or otherwise formulated from, for example, one or more blocks or arbitrary shapes of any size.

The one or more blocks may relate to, for example, a super macroblock, a macroblock, a macroblock partition, a sub-macroblock partition, and so forth.

Additionally, as used herein, the phrase "region partition information" refers to how the picture is partitioned into picture regions. Thus, such region partition information may include, but is not limited to, for example, the block size if the picture is partitioned into equally sized non-overlapped blocks, or object edges if the picture is partitioned based on an object.

Moreover, as used herein, the word "signal" refers to indicating something to a corresponding decoder. For example, the encoder may signal region partition information and/or filter parameters in order to make the decoder aware of which region partition information and filter parameters were used on the encoder side. In this way, the same region partition information and filter parameters may be used at both the encoder side and the decoder side. Thus, for example, an encoder may transmit a particular set of region partition information and filter parameters to the decoder so that the decoder may use the same particular set of region partition information and filter parameters or, if the decoder already has the particular region partition information and filter parameters as well as others, then signaling may be used (without transmitting) to simply allow the decoder to know and select the particular set of region partition information and filter parameters. By avoiding transmission of any actual region partition information and filter parameters, a bit savings may be realized. It is to be appreciated that signaling may be accomplished in a variety of ways. For example, one or more syntax elements, flags, and so forth may be used to signal information to a corresponding decoder.

Further, as used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Also, it is to be appreciated that while one or more examples of the present principles described herein may be so described with respect to two in-loop filters (Filter1 and Filter2) exploiting the shared segmentation information, the present principles are not limited to the same and, thus, other numbers of filters may also be used in accordance with the teachings of the present principles provided herein, while maintaining the spirit and scope of the present principles.

Turning to FIG. 1, a video encoder to which the present principles may be applied is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a partition optimizer 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the partition optimizer 165. An output of the partition optimizer 165 is connected in signal communication with an input of a filter-1 166. An output of the filter-1 166 is connected in signal communication with an input of a filter-2 167. An output of the filter-2 167 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture 101. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
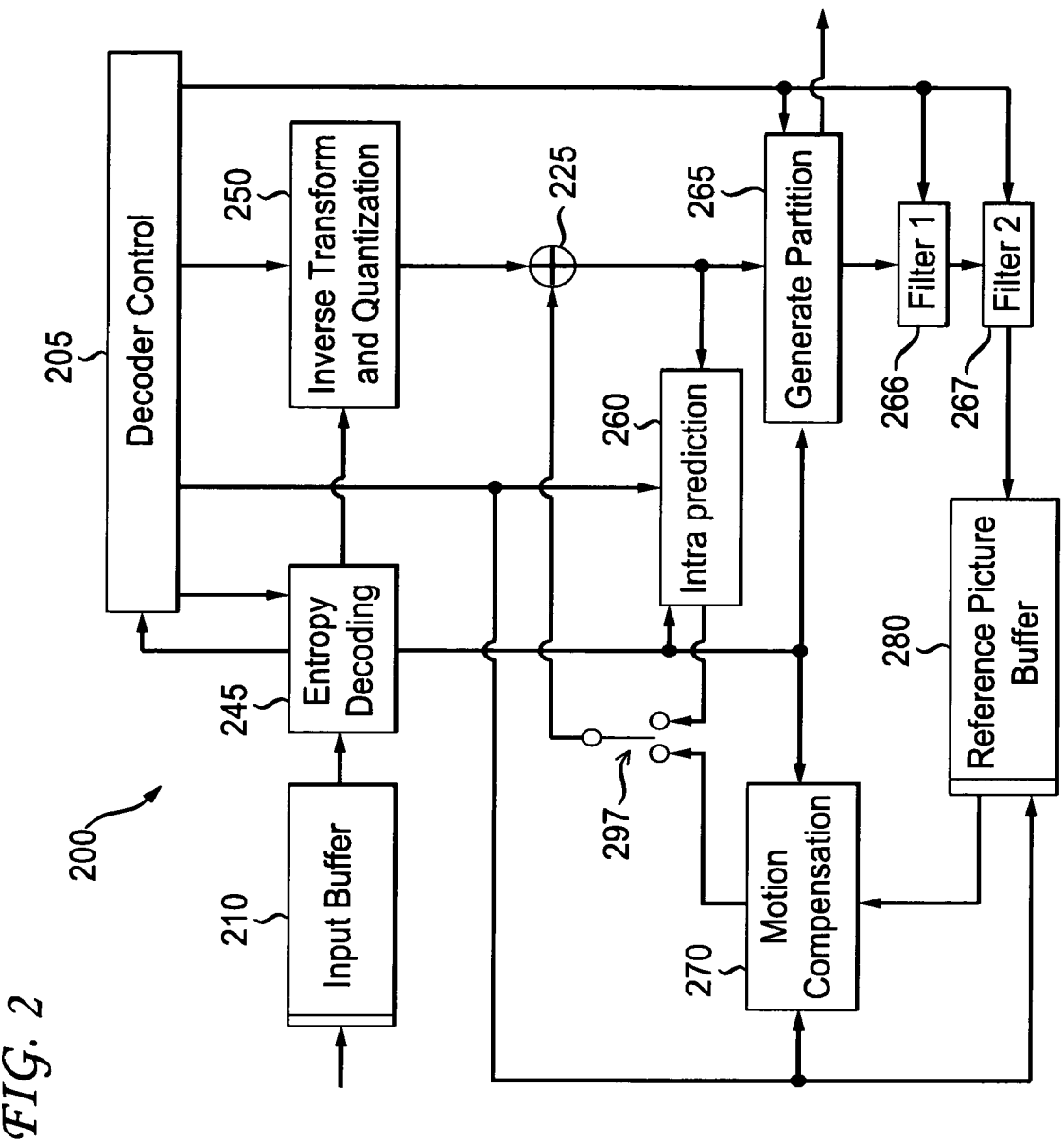
FIG. 2 is a block diagram for an exemplary video decoder to which the present principles may be applied in accordance with an embodiment of the present principles.

Turning to FIG. 2, a video decoder to which the present principles may be applied is indicated generally by the reference numeral 200.

The video decoder 200 includes an input buffer 210 having an output connected in signal communication with a first input of an entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a partition generator 265 and a first input of an intra prediction module 260. A second output of the partition generator 265 is connected in signal communication with a first input of a filter-1 266. An output of the filter-1 266 is connected in signal communication with a first input of a filter-2 267. An output of the filter-2 267 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the deblocking filter 265, and a third input of the intra predictor 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265, a second input of the filter-1 266, and a second input of the filter-2 267. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

As noted above, the present principles are directed to methods and apparatus for collaborative partition coding for region based filters. We observe there are a lot of consistency between segmentation results from various region based filters, since they are based on either video encoding information, like coding modes, or video content itself. Motivated by this observation and knowledge, we propose a collaborative coding approach for the partition/segmentation information of region based filters, in order to further improve the coding efficiency.

Thus, in accordance with one or more embodiments of the present principles, methods and apparatus are provided for collaboratively coding the partition information for multiple region based filters within an encoder/decoder. Since most of the region in-loop or out-loop filters want to adapt to the video content statistics, their partitions or segmentations based on the video content statistics should have correlations. In this way, the partition information of one filter can be shared with other filters to avoid spending more overhead bits.

In one embodiment, the partition/segmentation can be done and optimized jointly based on picture rate-distortion (RD) cost. Thus, the output partition/segmentation is optimal in the RD sense and can be used by all the filters joining the optimization. In each partition of a picture, different filters can set different filtering parameters for that region, which realizes the adaptation. In another embodiment, the segmentation/partition information is decided by jointly considering parameter adaptation based on coding information, picture content, and so forth.

In another embodiment, the partition can be performed and optimized for one filter. Then the output partition of this filter can be used for some other filters. This scheme can decrease the complexity in partition/segmentation optimization, but can also probably degrade the filtering performance.

In another embodiment, some of the filters can share the same region segmentation/partition information while other filters use their own segmentation/partition.

The region segmentation/partition information can be signaled using, for example, a high level syntax or a region level syntax. Alternatively, the region segmentation/partition information can be inferred from previous coded regions/pictures/sequences.

Syntax

TABLE 1 shows exemplary slice header syntax elements in accordance with an embodiment of the present principles.

TABLE 1

| slice_header( ) { | Descriptor |
|---|---|
| ... | |
| share_partition_flag | u(1) |
| If (share_partition_flag==1){ | |
|    shared_filter_seg_info | u(v) |
| } | |
| else | |
| { | |
|   For (i=0; i<num_of_filters; i++){ | |
|     filter_seg_info[i] | u(v) |
|   } | |
| } | |
| ... | |
| } | |

Semantics of some of the syntax elements of TABLE 1 are as follows:

share_partition_flag equal to 1 specifies that a collaborative partition approach is used for the slice. share_partition_flag equal to 0 specifies that a collaborative partition approach is not used which, in turn, means that each filter will use its own partitions.

shared_filter_seg_info specifies the filter segmentation information that is shared among multiple filters.

filter_seg_info[i] specifies the filter segmentation information of the $i^{th}$ filter if it does not use the shared segmentation information.

Figure 3:
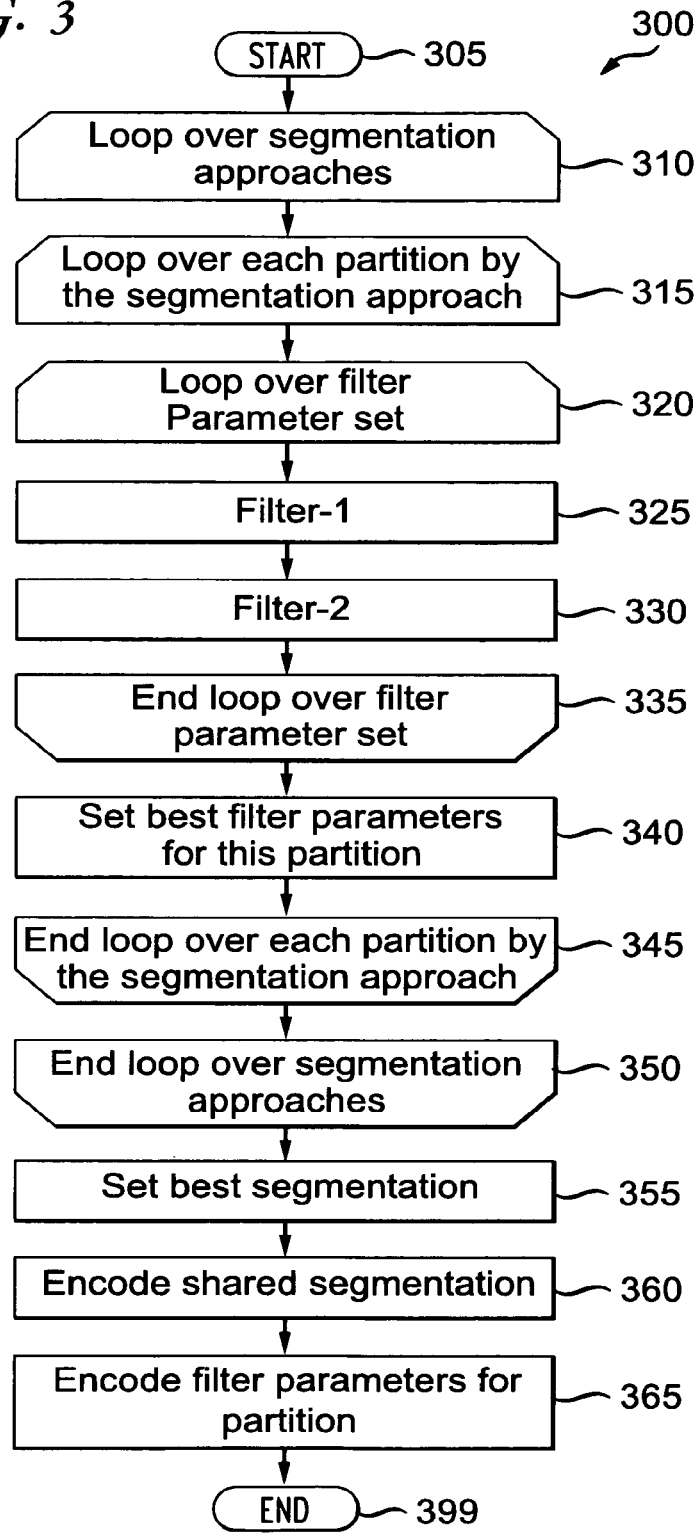
FIG. 3 is a flow diagram for an exemplary method for encoding picture data using collaborative partition coding for region based filters in accordance with an embodiment of the present principles.

Turning to FIG. 3, an exemplary method for encoding picture data using collaborative partition coding for region based filters is indicated generally by the reference numeral 300. The method 300 includes a start block 305 that passes control to a loop limit block 310. The loop limit block 310 begins a loop over (different available) segmentation approaches, and passes control to a loop limit block 315. The loop limit block 315 begins a loop over each (available) partition by the (current) segmentation approach, and passes control to a loop limit block 320. The loop limit block 320 loops over the filter parameter set, and passes control to a function block 325. The function block 325 performs filtering using a first filter (filter-1), and passes control to a function block 330. The function block 330 performs filtering using a second filter (filter-2), and passes control to a loop limit block 335. The loop limit block 335 ends the loop over the filter parameter set, and passes control to a function block 340. The function block 340 sets the best filter parameters for this partition (e.g., based on a rate-distortion cost and/or some other criteria), and passes control to a loop limit block 345. The loop limit block 345 ends the loop over each partition by the segmentation approach, and passes control to a loop limit block 350. The loop limit block 350 ends the loop over the segmentation approaches, and passes control to a function block 355. The function block 355 sets the best segmentation (e.g., based on a rate-distortion cost and/or some other criteria), and passes control to a function block 360. The function block 360 encodes the shared segmentation, and passes control to a function block 365. The function block 365 encodes the filter parameters for the partition, and passes control to an end block 399.

Figure 4:
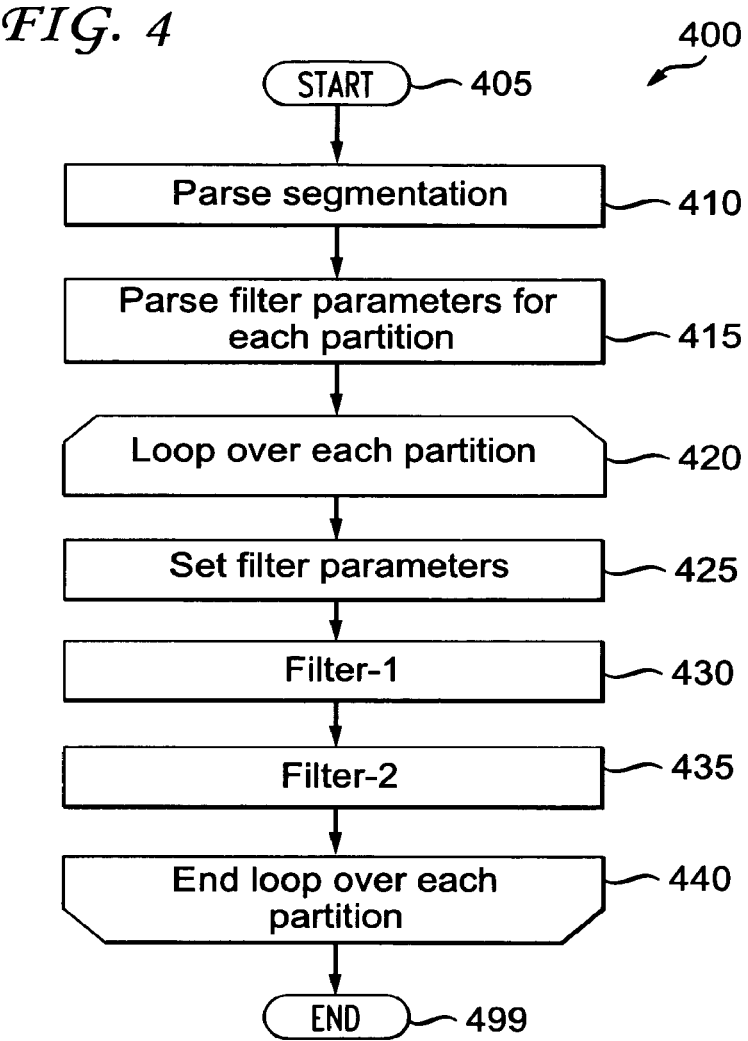
FIG. 4 is a flow diagram for an exemplary method for decoding picture data using collaborative partition coding for region based filters in accordance with an embodiment of the present principles.

Turning to FIG. 4, an exemplary method for decoding picture data using collaborative partition coding for region based filters is indicated generally by the reference numeral 400. The method 400 includes a start block 405 that passes control to a function block 410. The function block 410 parses the current segmentation, and passes control to a function block 415. The function block 415 parses the filter parameters for each partition, and passes control to a loop limit block 420. The loop limit block 420 begins a loop over each partition, and passes control to a function block 425. The function block 425 sets the filter parameters, and passes control to a function block 430. The function block 430 performs filtering using filter-1, and passes control to a function block 435. The function block 435 performs filtering using filter-2, and passes control to a loop limit block 440. The loop limit block 440 ends the loop over each partition, and passes control to an end block 499.

Figure 5:
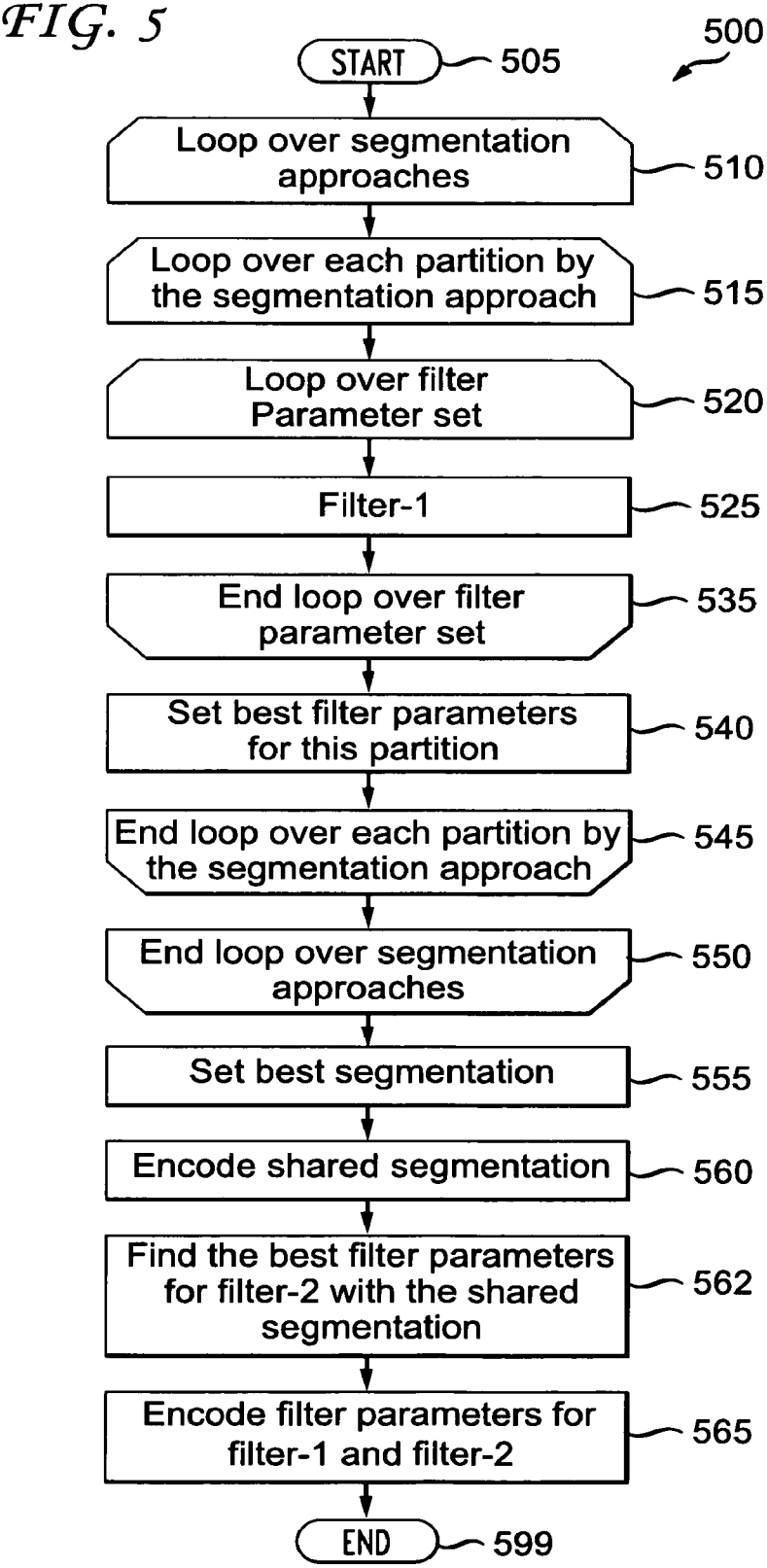
FIG. 5 is a flow diagram for another exemplary method for encoding picture data using collaborative partition coding for region based filters in accordance with an embodiment of the present principles.

Turning to FIG. 5, another exemplary method for encoding picture data using collaborative partition coding for region based filters is indicated generally by the reference numeral 500. The method 500 includes a start block 505 that passes control to a loop limit block 510. The loop limit block 510 begins a loop over (different available) segmentation approaches, and passes control to a loop limit block 515. The loop limit block 515 begins a loop over each (available) partition by the (current) segmentation approach, and passes control to a loop limit block 520. The loop limit block 520 begins a loop over a filter parameter set, and passes control to a function block 525. The function block 525 performs filtering using filter-1, and passes control to a loop limit block 535. The loop limit block 535 ends the loop over the filter parameter set, and passes control to a function block 540. The function block 540 sets the best filter parameters for this partition (e.g., based on a rate-distortion cost and/or some other criteria), and passes control to a loop limit block 545. The loop limit block 545 ends the loop over each partition by the segmentation approach, and passes control to a loop limit block 550. The loop limit block 550 ends the loop over the segmentation approaches, and passes control to a function block 555. The function block 555 sets the best segmentation (e.g., based on a rate-distortion cost and/or some other criteria), and passes control to a function block 560. The function block 560 encodes the shared segmentation, and passes control to a function block 562. The function block 562 finds the best filter parameters for filter-2 with the shared segmentation, and passes control to a function block 565. The function block 565 encodes the filter parameters for filter-1 and filter-2, and passes control to an end block 599.

Figure 6:
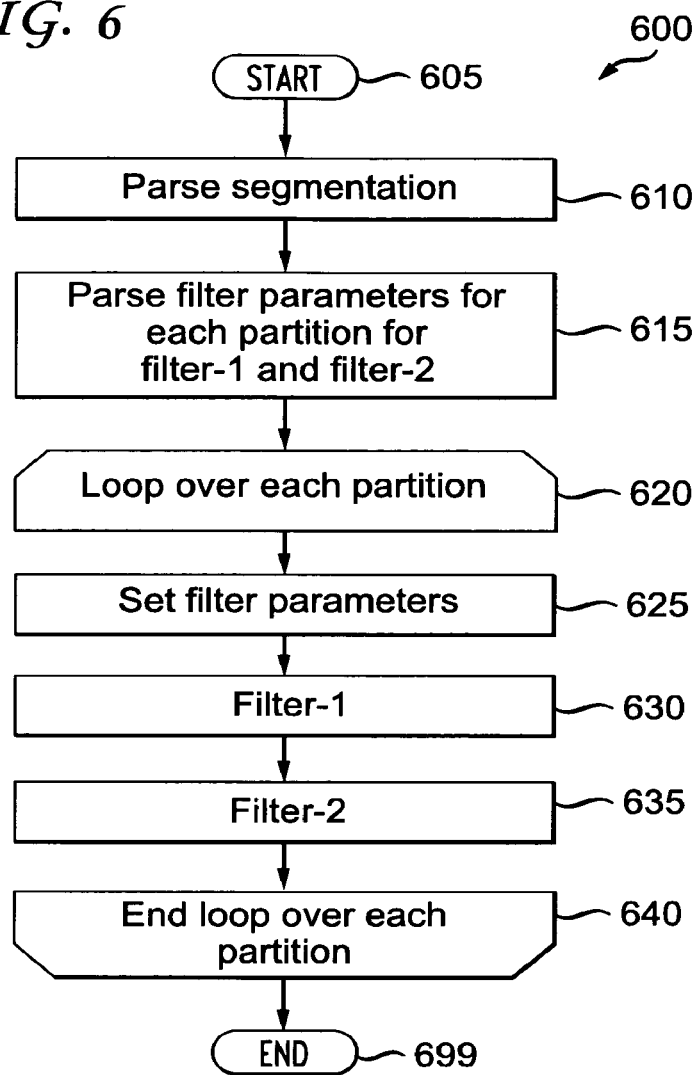
FIG. 6 is a flow diagram for another exemplary method for decoding picture data using collaborative partition coding for region based filters in accordance with an embodiment of the present principles.

Turning to FIG. 6, another exemplary method for decoding picture data using collaborative partition coding for region based filters is indicated generally by the reference numeral 600. The method 600 includes a start block 605 that passes control to a function block 610. The function block 610 parses a segmentation, and passes control to a function block 615. The function block 615 parses filter parameters for each partition for filter-1 and filter-2, and passes control to a loop limit block 620. The loop limit block 620 begins a loop over each partition, and passes control to a function block 625. The function block 625 sets the filter parameters, and passes control to a function block 630. The function block 630 performs filtering using filter-1, and passes control to a function block 635. The function block 635 performs filtering using filter-2, and passes control to a loop limit block 640. The loop limit block 640 ends the loop over each partition, and passes control to an end block 699.

Figure 7:
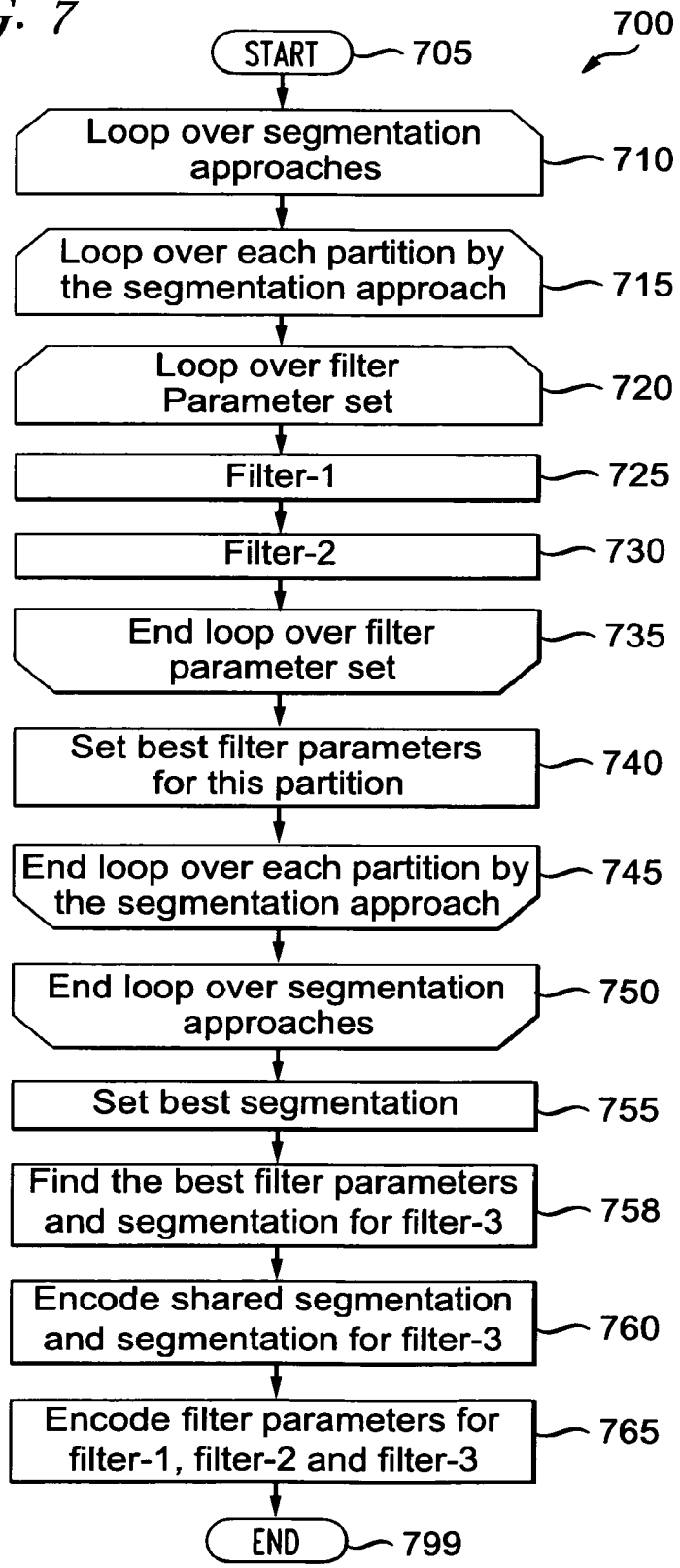
FIG. 7 is a flow diagram for yet another exemplary method for encoding picture data using collaborative partition coding for region based filters in accordance with an embodiment of the present principles.

Turning to FIG. 7, yet another exemplary method for encoding picture data using collaborative partition coding for region based filters is indicated generally by the reference numeral 700. The method 700 includes a start block 705 that passes control to a loop limit block 710. The loop limit block 710 begins a loop over (available) segmentation approaches, and passes control to a loop limit block 715. The loop limit block 715 begins a loop over each partition by the (current) segmentation approach, and passes control to a loop limit block 720. The loop limit block 720 begins a loop over a filter parameter set, and passes control to a function block 725. The function block 725 performs filtering using filter-1, and passes control to a function block 730. The function block 730 performs filtering using filter-2, and passes control to a loop limit block 735. The loop limit block 735 ends the loop over the filter parameter set, and passes control to a function block 740. The function block 740 sets the best filter parameters for this partition (e.g., based on a rate-distortion cost and/or some other criteria), and passes control to a loop limit block 745. The loop limit block 745 ends the loop over each partition by the segmentation approach, and passes control to a loop limit block 750. The loop limit block 750 ends the loop over the segmentation approaches, and passes control to a function block 755. The function block 755 sets the best segmentation (e.g., based on a rate-distortion cost and/or some other criteria), and passes control to a function block 758. The function block 758 finds the best filter parameters and segmentation for filter-3, and passes control to a function block 760. The function block 760 encodes the shared segmentation and (any non-shared) segmentation for filter-3, and passes control to a function block 765. The function block 765 encodes filter parameters for filter-1, filter-2, and filter-3, and passes control to an end block 799.

Figure 8:
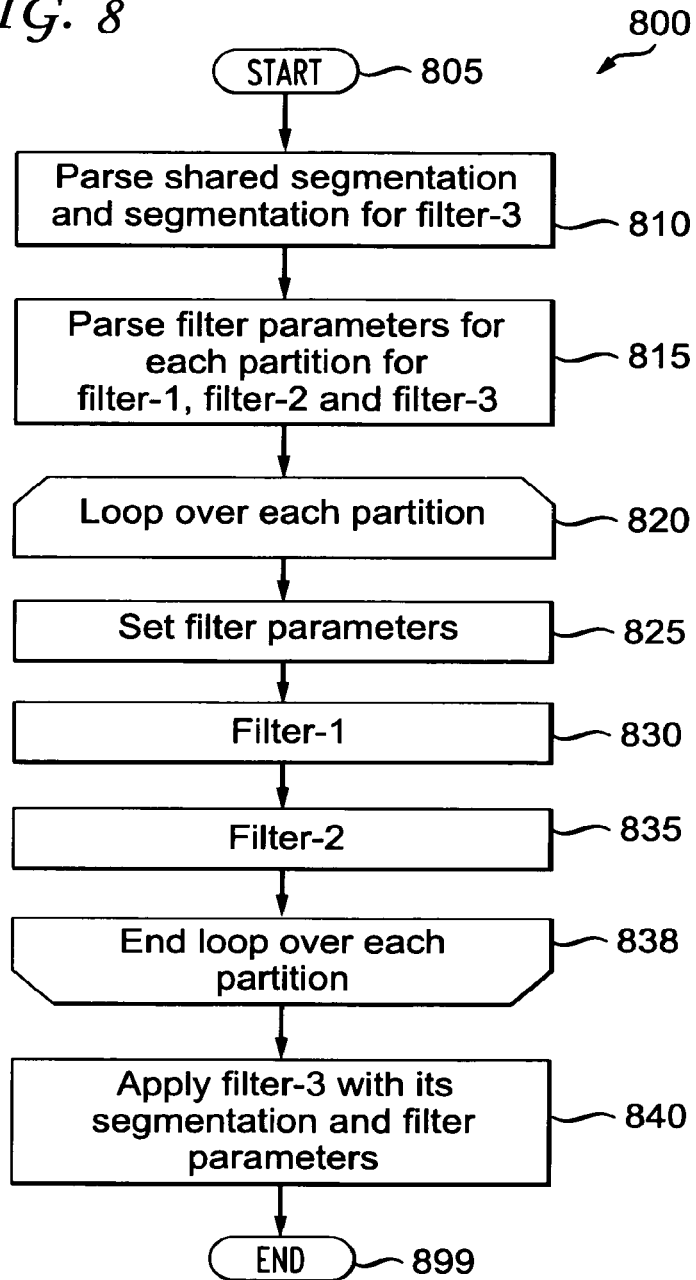
FIG. 8 is a flow diagram for yet another exemplary method for decoding picture data using collaborative partition coding for region based filters in accordance with an embodiment of the present principles.

Turning to FIG. 8, yet another exemplary method for decoding picture data using collaborative partition coding for region based filters is indicated generally by the reference numeral 800. The method 800 includes a start block 805 that passes control to a function block 810. The function block 810 parses the shared segmentation and (non-shared) segmentation for filter-3, and passes control to a function block 815. The function block 815 parses filter parameters for each partition for filter-1, filter-2, and filter-3, and passes control to a loop limit block 820. The loop limit block 820 begins a loop over each partition, and passes control to a function block 825. The function block 825 sets filter parameters, and passes control to a function block 830. The function block 830 performs filtering using filter-1, and passes control to a function block 835. The function block 835 performs filtering using filter-2, and passes control to a loop limit block 838. The loop limit block 838 ends the loop over each partition, and passes control to a function block 840. The function block 840 applies filter-3 and its segmentation and filter parameters, and passes control to an end block 899.

A description will now be given of some of the many attendant advantages/features of the present invention, some of which have been mentioned above. For example, one advantage/feature is an apparatus having a video encoder for encoding image data for a plurality of regions in a picture. The video encoder includes multiple filters for filtering the image data based on region partition information for the plurality of regions. The region partition information for the plurality of regions is shared between the multiple filters.

Another advantage/feature is the apparatus having the video encoder as described above, wherein the region partition information is combined with filter parameter adaptation based on at least one of coding information and picture content.

Yet another advantage/feature is the apparatus having the video encoder as described above, wherein at least one of the region partition information and filter parameters for the multiple filters are signaled using one or more high level syntax elements or one or more region level syntax elements, or are inferred by a corresponding decoder from at least one of previously coded regions, previously coded pictures, and previously coded video sequences, the picture corresponding to a currently coded video sequence.

Still another advantage/feature is the apparatus having the video encoder as described above, wherein the multiple filters include at least one of at least one in-loop filter, at least one out-loop filter, at least one pre-processing filter, and at least one post-processing filter.

Moreover, another advantage/feature is the apparatus having the video encoder as described above, wherein a partitioning of the picture into the plurality of regions, from which the region partitioning information is based, is jointly optimized by the multiple filters.

Further, another advantage/feature is the apparatus having the video encoder as described above, wherein a partitioning of the picture into the plurality of regions, from which the region partitioning information is based, is optimized by one of the multiple filters, and is shared with other ones of the multiple filters.

Also, another advantage/feature is the apparatus having the video encoder as described above, wherein the region partition information for the plurality of regions is shared by at least two of the multiple filters while at least one other of the multiple filters separately determines the region partition information to be used there by.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding image data for a plurality of regions in a picture, wherein said video encoder comprises multiple filters for filtering the image data based on region partition information for the plurality of regions, the region partition information defining segmentation of a picture into a plurality of regions, and wherein the multiple filters being used with different filtering parameters in each region, and wherein at least two of the multiple filters use the same segmentation based on shared region partition information, and the region partition information is separately determined for at least one other of the multiple filters, wherein the encoder uses signaling to allow a decoder to select the particular set of region partition information and filter parameters used by the multiple filters during encoding.

2. The apparatus of claim 1, wherein the region partition information is combined with filter parameter adaptation based on at least one of coding information and picture content.

3. The apparatus of claim 1, wherein at least one of the region partition information and filter parameters for the multiple filters are signaled using one or more high level syntax elements or one or more region level syntax elements, or are inferred by a corresponding decoder from at least one of previously coded regions, previously coded pictures, and previously coded video sequences, the picture corresponding to a currently coded video sequence.

4. The apparatus of claim 1, wherein the multiple filters comprise at least one of at least one in-loop filter, at least one out-loop filter, at least one pre-processing filter, and at least one post-processing filter.

5. The apparatus of claim 1, wherein a partitioning of the picture into the plurality of regions, from which the region partitioning information is based, is jointly optimized by the multiple filters.

6. The apparatus of claim 1, wherein a partitioning of the picture into the plurality of regions, from which the region partitioning information is based, is optimized by one of the multiple filters, and is shared with other ones of the multiple filters.

7. In a video encoder, a method, comprising:
encoding image data for a plurality of regions in a picture, wherein said video encoder comprises multiple filters for filtering the image data based on region partition information for the plurality of regions, the region partition information defining segmentation of a picture into a plurality of regions, and wherein the multiple filters being used with different filtering parameters in each region, and wherein at least two of the multiple filters use the same segmentation based on shared region partition information, and the region partition information is separately determined for at least one other of the multiple filters, wherein the encoder uses signaling to allow a decoder to select the particular set of region partition information and filter parameters used by the multiple filters during encoding.

8. The method of claim 7, wherein the region partition information is combined with parameter adaptation based on at least one of coding information and picture content.

9. The method of claim 7, wherein at least one of the region partition information and filter parameters for the multiple filters are signaled using one or more high level syntax elements or one or more region level syntax elements, or are inferred by a corresponding decoder from at least one of previously coded regions, previously coded pictures, and previously coded video sequences, the picture corresponding to a currently coded video sequence.

10. The method of claim 7, wherein the multiple filters comprise at least one of at least one in-loop filter, at least one out-loop filter, at least one pre-processing filter, and at least one post-processing filter.

11. The method of claim 7, wherein a partitioning of the picture into the plurality of regions, from which the region partitioning information is based, is jointly optimized by the multiple filters.

12. The method of claim 7, wherein a partitioning of the picture into the plurality of regions, from which the region partitioning information is based, is optimized by one of the multiple filters, and is shared with other ones of the multiple filters.

13. An apparatus, comprising:
a video decoder for decoding image data for a plurality of regions in a picture, wherein said video decoder comprises multiple filters for filtering the image data based on region partition information for the plurality of regions, the region partition information defining segmentation of a picture into a plurality of regions, and wherein the multiple filters being used with different filtering parameters in each region, and wherein at least two of the multiple filters use the same segmentation based on shared region partition information, and the region partition information is separately determined for at least one other of the multiple filters, wherein the decoder uses signaling to allow a decoder to select the particular set of region partition information and filter parameters used by the multiple filters during decoding.

14. The apparatus of claim 13, wherein the region partition information is combined with parameter adaptation based on at least one of coding information and picture content.

15. The apparatus of claim 13, wherein at least one of the region partition information and filter parameters for the multiple filters are determined from one or more high level syntax elements or one or more region level syntax elements, or are inferred from at least one of previously coded regions, previously coded pictures, and previously coded video sequences, the picture corresponding to a currently coded video sequence.

16. The apparatus of claim 13, wherein the multiple filters comprise at least one of at least one in-loop filter, at least one out-loop filter, at least one pre-processing filter, and at least one post-processing filter.

17. In a video decoder, a method, comprising:
decoding image data for a plurality of regions in a picture, wherein the image data is filtered by multiple filters based on region partition information for the plurality of regions, the region partition information defining segmentation of a picture into a plurality of regions, and wherein the multiple filters being used with a different filter and different filtering parameters in each region, and wherein at least two of the multiple filters use the same segmentation based on shared region partition information, and the region partition information is separately determined for at least one other of the multiple filters, wherein the decoder uses signaling to allow a decoder to select the particular set of region partition information and filter parameters used by the multiple filters during decoding.

18. The method of claim 17, wherein the region partition information is combined with parameter adaptation based on at least one of coding information and picture content.

19. The method of claim 17, wherein at least one of the region partition information and filter parameters for the multiple filters are determined from one or more high level syntax elements or one or more region level syntax elements, or are inferred from at least one of previously coded regions, previously coded pictures, and previously coded video sequences, the picture corresponding to a currently coded video sequence.

* * * * *